United States Patent
Cao

(10) Patent No.: US 9,122,894 B2
(45) Date of Patent: Sep. 1, 2015

(54) METHOD AND APPARATUS FOR ENCRYPTION

(71) Applicant: TENCENT TECHNOLOGY (SHENZHEN) COMPANY LIMITED, Shenzhen, Guangdong (CN)

(72) Inventor: Liang Cao, Shenzhen (CN)

(73) Assignee: TENCENT TECHNOLOGY (SHENZHEN) COMPANY LIMITED, Shenzhen, Guangdong ( * ) Notice: Subject to any disclaimer, the term of this patent is extended or adjusted under 35 U.S.C. 154(b) by 54 days.

(21) Appl. No.: 14/082,715

(22) Filed: Nov. 18, 2013

(65) Prior Publication Data

US 2014/0095893 A1    Apr. 3, 2014

Related U.S. Application Data

(63) Continuation of application No. PCT/CN2013/083469, filed on Sep. 13, 2013.

(30) Foreign Application Priority Data

Sep. 19, 2012    (CN) .......................... 2012 1 0347705

(51) Int. Cl.
| | |
|---|---|
| H04L 9/32 | (2006.01) |
| G06F 21/72 | (2013.01) |
| G06F 21/60 | (2013.01) |
| G06F 21/74 | (2013.01) |

(52) U.S. Cl.
CPC .............. *G06F 21/72* (2013.01); *G06F 21/602* (2013.01); *G06F 21/74* (2013.01)

(58) Field of Classification Search
CPC . G06F 21/72; G06F 12/1408; G06F 12/1475; G06F 12/1458; G06F 21/602; G06F 21/74
USPC ............... 713/164, 189, 190, 193; 726/14, 15
See application file for complete search history.

(56) References Cited

U.S. PATENT DOCUMENTS

| | | | | |
|---|---|---|---|---|
| 7,810,133 | B2* | 10/2010 | Carter et al. | ....................... 726/2 |
| 7,870,153 | B2* | 1/2011 | Croft et al. | ..................... 707/781 |
| 8,051,180 | B2* | 11/2011 | Mazzaferri et al. | ........... 709/227 |
| 2008/0201129 | A1 | 8/2008 | Natvig | |
| 2010/0306849 | A1* | 12/2010 | Zheng et al. | .................... 726/24 |

FOREIGN PATENT DOCUMENTS

| | | |
|---|---|---|
| CN | 101071463 A | 11/2007 |
| CN | 101290569 A | 10/2008 |

OTHER PUBLICATIONS

State Intellectual Property Office of P. R. China (ISR/CN), "International Search Report", Dec. 12, 2013, China.

* cited by examiner

*Primary Examiner* — Hosuk Song
(74) *Attorney, Agent, or Firm* — Tim Tingkang Xia, Esq.; Locke Lord LLP

(57) ABSTRACT

Method and apparatus for encryption, and a non-transitory computer-readable medium that stores instructions for performing encryption. The method includes loading a virtual system driver module in a host operating system and constructing a virtual operating system, wherein the virtual operating system comprises a micro-kernel; preparing and providing context of a processor and a memory page table by the virtual system driver for the micro-kernel, and mapping, in the memory page table, original data and a physical address of a buffer area that receives data after encryption computation is completed; and completing the encryption computation in the virtual operating system and saving the computation result in the buffer area.

12 Claims, 3 Drawing Sheets

METHOD AND APPARATUS FOR ENCRYPTION

CROSS-REFERENCE TO RELATED APPLICATION

This application is a continuation application of International Patent Application No. PCT/CN2013/083469, filed Sep. 13, 2013, which itself claims the priority to Chinese Patent Application No. 201210347705.1, filed Sep. 19, 2012 in the State Intellectual Property Office of P.R. China, which are hereby incorporated herein in their entireties by reference.

FIELD OF THE INVENTION

The present invention relates to the field of computers, and more particularly to method and apparatus for encryption and a non-transitory computer-readable medium that stores instructions to perform encryption.

BACKGROUND OF THE INVENTION

No matter for the purpose of anti-piracy or user data protection, each type of software has some key data that needs to be protected, such as the sequence number, user name and password of the software. At present, the data protection is generally implemented through complex data conversion or through dongle of various types of hardware.

In the protection manner by using a complex algorithm, a cracker may track and recover the algorithmic logic through a software debugging technology, or directly intercept the original assembly code in the software to directly recover the data encryption process.

In the protection manner by using dongle, the cost is high and the usability is low; the computing capability of the dongle is limited, and the processing speed is low when large-volume and high-intensity encryption is implemented; the dongle product is relatively independent, and once the dongle of a certain brand is cracked (that is, the dongle is disabled), all types of software that employ the dongle of this brand are at risk; and the encryption algorithm of the dongle cannot be flexibly controlled, and cannot be flexibly changed after being selected.

Therefore, a heretofore unaddressed need exists in the art to address the aforementioned deficiencies and inadequacies.

SUMMARY OF THE INVENTION

One of objectives of the present invention is to provide an encryption method and an encryption apparatus, and a non-transitory computer-readable medium that stores instructions to perform encryption, which cannot be cracked, and overcome the defects of high hardware encryption cost and low computing speed.

In one aspect of the invention, the encryption method includes loading a virtual system driver module in a host operating system and constructing a virtual operating system, where the virtual operating system includes a micro-kernel; preparing and providing context of a processor and a memory page table by the virtual system driver for the micro-kernel, and mapping, in the memory page table, original data and a physical address of a buffer area that receives data after encryption computation is completed; and completing the encryption computation in the virtual operating system and saving the computation result in the buffer area.

In another aspect of the invention, the encryption apparatus includes a virtual operating system and a driver module. The virtual operating system includes a micro-kernel, configured to run an assembly instruction sequence. The driver module is configured to prepare and provide context of a processor and a memory page table for the micro-kernel, and mapping, in the memory page table, original data and a physical address of a buffer area that receives data after encryption computation is completed. The virtual operating system further includes: an encryption process manager, configured to control the micro-kernel to complete the encryption computation according to the original data and saving the encryption computation result in the buffer area.

In yet another aspect of the present invention, the non-transitory computer-readable medium storing instructions which, when executed by one or more processors, cause the foregoing disclosed apparatus to perform the foregoing disclosed method for performing encryption.

In the encryption method and apparatus, the encryption computation is completed in the virtual operating system, and since the context of the CPU in the virtual operating system is completely different from that of a real CPU, a conventional hardware tracking and debugging technology, such as a trap flag (TF) in a DR0-DR7 register or a flag register, is completely invalid in the virtual operating system, thereby ensuring that the encryption computation process in the virtual operating system cannot be interrupted, so as to prevent a cracker from cracking an encryption algorithm by using the hardware tracking and debugging technology. Besides, there is no need to adopt a dedicated hardware encryption apparatus, thereby reducing the cost.

These and other aspects of the present invention will become apparent from the following description of the preferred embodiment taken in conjunction with the following drawings, although variations and modifications therein may be affected without departing from the spirit and scope of the novel concepts of the present invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the invention.

DETAILED DESCRIPTION OF THE INVENTION

Figure 1:
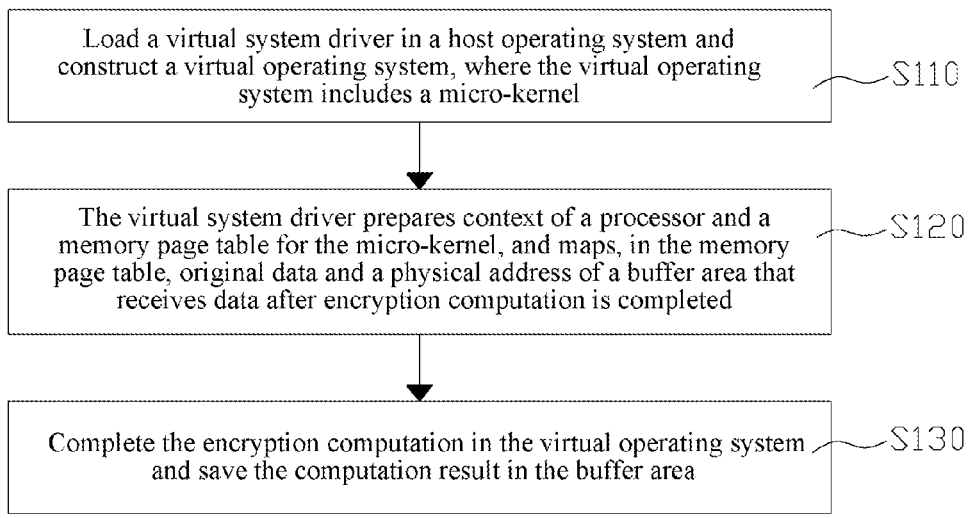
FIG. 1 is a flow chart of an encryption method according to one embodiment of the invention.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

The description will be made as to the embodiments of the present invention in conjunction with the accompanying drawings in FIGS. 1-3. It should be understood that specific embodiments described herein are merely intended to explain the present invention, but not intended to limit the present invention. In accordance with the purposes of this invention, as embodied and broadly described herein, this invention, in one aspect, relates to method and apparatus for performing encryption, and a non-transitory computer-readable medium storing instructions which, when executed by one or more processors, cause the apparatus to perform the method for performing encryption.

Referring to FIG. 1, a flow chart of an encryption method is shown according to one embodiment of the invention. The method includes, among other things, the following steps.

At step S110: Loading a virtual system driver in a host operating system and constructing a virtual operating system, where the virtual operating system includes a micro-kernel.

The host operating system refers to any operating system that can be installed and run in a computer or a similar computing apparatus such as a smartphone or a tablet computer, or the like.

The virtual system driver is running in the host operating system and is invoked by protected software. In other words, the protected software sends an encryption computation request to the virtual system driver and provides original data thereto. The virtual system driver may construct a virtual operating system after receiving the encryption computation request, and provide the original data to the virtual operating system.

The micro-kernel serves as an independent processor (CPU) for a program running in the virtual operating system, and is configured to run an assembly instruction set, so as to complete encryption computation. However, the instruction set that can be run by the micro-kernel may be reduced relative to a real CPU, as long as the instruction set satisfies the requirement for the encryption computation. In the actual implementation, the micro-kernel directly sends the instruction to the real CPU for execution and does not perform operations such as instruction conversion and translation, and saves, in a specific memory area, the execution result of the real CPU as the computation result of the program running in the virtual operating system.

At step S120: The virtual system driver prepares context of a processor and a memory page table for the micro-kernel, and maps, in the memory page table, original data and a physical address of a buffer area that receives data after encryption computation is completed.

It can be understood that, for a CPU, regardless of being a real CPU or a virtual CPU, to enable the CPU to perform computation, context of the CPU (values of a register in the CPU) needs to be prepared for the CPU, and codes (instruction sequences) and data (operation targets of the instruction sequences) are prepared in the memory. The CPU executes the instruction sequences one by one, and continuously operates the data, so as to complete the data computing process.

Figure 2:
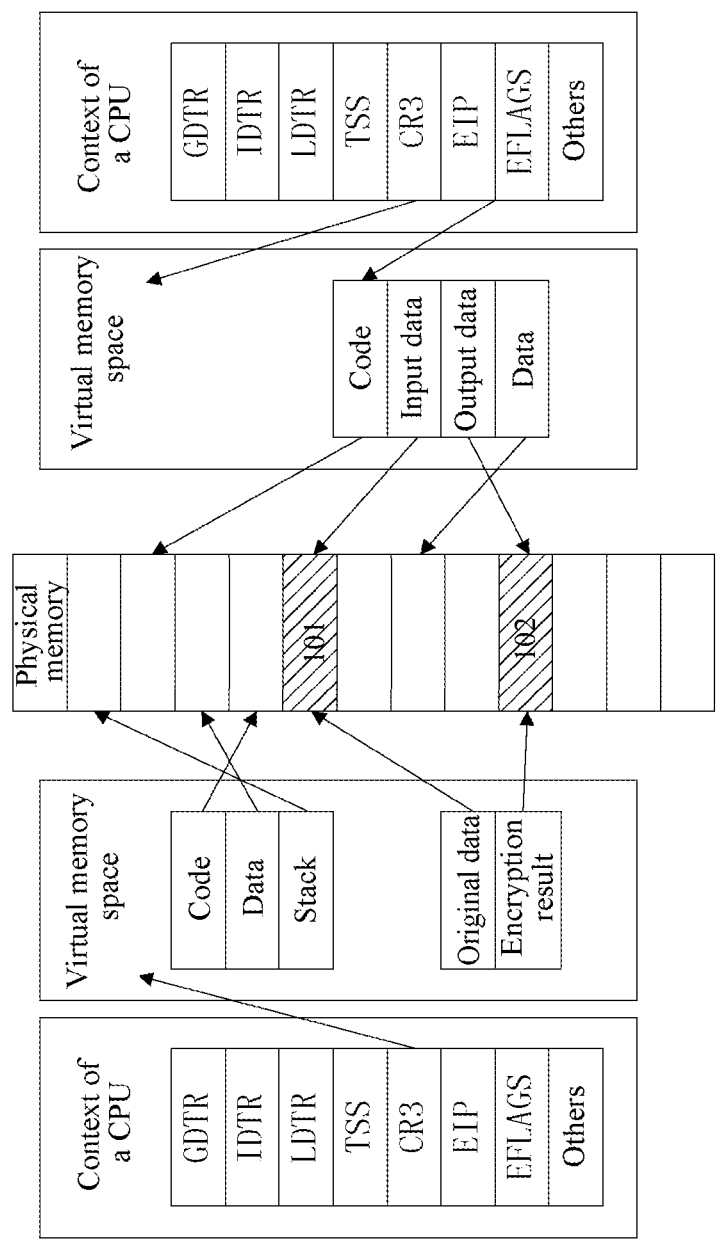
FIG. 2 is a schematic diagram of page table mapping in the encryption method according to the embodiment of the invention shown in FIG. 1.

FIG. 2 shows a schematic diagram of a physical memory space according to one embodiment of the invention. A first area 101 is configured to storing original data requiring for encryption computation; and a second area 102 is a buffer area configured to storing data after the encryption computation is completed. However, the program running in the operating system directly operates data in a virtual memory space, and mapping between the virtual memory space and the physical memory space is implemented through a page table of the operating system.

In view of the above, if data exchange needs to be directly performed between the host operating system and the virtual operating system through a physical memory, mapping toward the same physical memory space is required to be implemented in page tables of the host operating system and the virtual operating system respectively. In this case, data written into the first area 101 becomes a data source of an encryption program in the virtual operating system.

At step S130: Completing the encryption computation in the virtual operating system and saving the computation result in the buffer area.

After the encryption process proceeds to the virtual operating system, interrupt may be first terminated, for example, an interrupt flag bit of a flag register is set to 0, to shield the micro-kernel from responding to an external interrupt request.

In the virtual operating system, the encryption program may successfully access, through the page table, the original data stored in the first area 101 of the physical memory, and adopt a built-in encryption algorithm to complete the encryption computation. After the computation is completed, the result is saved in the second area 102 of the physical memory. Correspondingly, in the host operating system, the data after the encryption computation is completed may be accessed through the page table.

The original data provided by the protected software may be pure data or a combination of codes and data, which is generally configured to decryption.

When the provided original data is pure data, an encryption algorithm is adopted to perform encryption computation.

When the provided original data is a combination of codes and data, the original data needs to be decrypted according to a predetermined algorithm to obtain the real original data, for example, a built-in password of compression software, such as 7z, is adopted for decompression; the codes are extracted from the real original data; and the extracted codes are run to complete the encryption computation.

After the encryption computation is completed, the virtual system driver may return the data resulted from the encryption computation to the protected software.

In the encryption method of this embodiment, the encryption computation is completed in the virtual operating system, and since the context of the CPU in the virtual operating system is completely different from that of a real CPU, a conventional hardware tracking and debugging technology, such as a TF in a DR0-DR7 register or a flag register, is completely invalid in the virtual operating system, thereby ensuring that the encryption computation process in the virtual operating system cannot be interrupted, so as to prevent a cracker from cracking an encryption algorithm by using the hardware tracking and debugging technology.

Furthermore, as a brand-new page table is used in the virtual operating system, a memory address (logic address) in the host operating system is invalid to the virtual operating system, so a CC breakpoint is generally invalid to the virtual operating system. It can be understood that, the CC breakpoint refers to, for example, an INT3 instruction, and with a machine code being CC, the CC breakpoint is also called a CC instruction. When a debugged process executes the INT3 instruction to cause an exception, a debugger captures the exception and stops at the breakpoint, to recover the instruction at the breakpoint to the original instruction. Definitely, if the debugger is written by a user, some other instructions may be used to replace the INT3 instruction to trigger an exception.

It can be understood that, the cracker is capable of maliciously forging a CC breakpoint, for example, in the foregoing situation that the original data includes codes, a maliciously forged CC breakpoint may exist in the codes. The above problem may be solved by returning to the host operating system when detecting a soft interrupt (the CC breakpoint belongs to the soft interrupt). It can be understood that, although the interrupt is implemented, the encryption computation process is ended without being completed, and in this case, even if data is obtained, the obtained data is invalid intermediate data, and cannot be configured to cracking the encryption algorithm.

Figure 3:
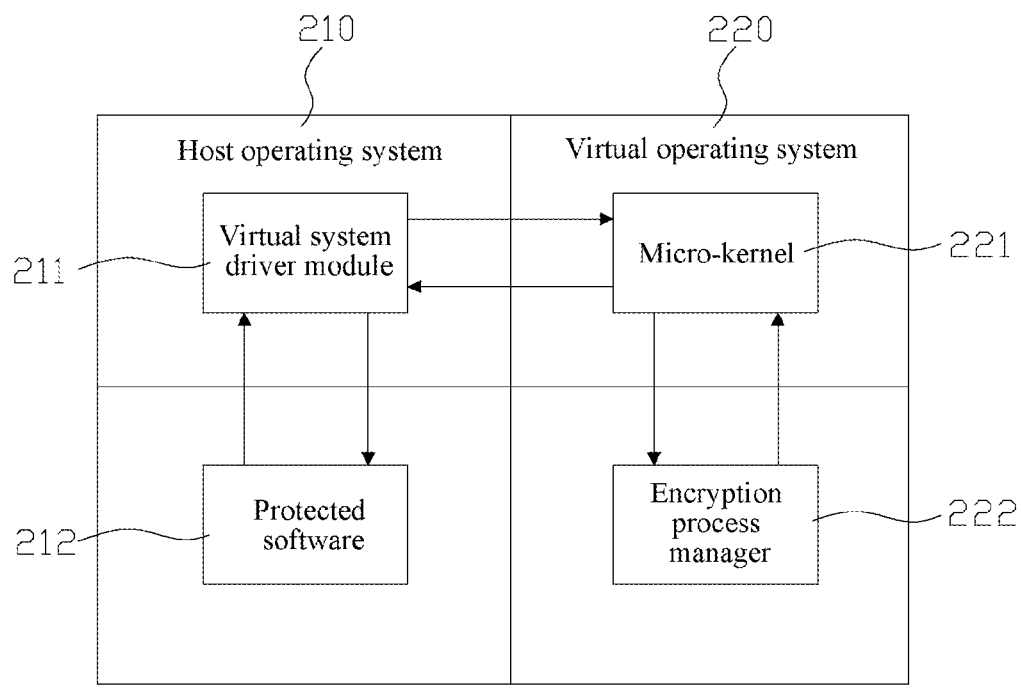
FIG. 3 is a structural block diagram of an encryption apparatus according to one embodiment of the invention.

Referring to FIG. 3, an encryption apparatus is shown according to one embodiment of the invention. The encryption apparatus includes a host operating system 210 and a virtual operating system 220. The host operating system 210 includes a virtual system driver module 211 and protected software 212. The virtual operating system 220 includes a micro-kernel 221 and an encryption process manager 222.

The host operating system 210 refers to any operating system that can be installed and run in a computer or a similar computing apparatus such as a smartphone or a tablet computer, or the like.

The virtual system driver module 211 is running in the host operating system and is invoked by the protected software; in other words, the protected software 212 sends an encryption computation request to the virtual system driver module 211 and provides original data thereto. The virtual system driver module 211 may construct the virtual operating system 220 after receiving the encryption computation request, and provide the original data to the virtual operating system 220.

The micro-kernel 221 serves as an independent processor (CPU) for a program running in the virtual operating system 210, and is configured to run an assembly instruction set, so as to complete encryption computation. However, the instruction set that can be run by the micro-kernel 221 may be reduced relative to a real CPU, as long as the instruction set satisfies the requirement for the encryption computation. In the actual implementation, the micro-kernel 221 directly sends the instruction to the real CPU for execution and does not perform operations such as instruction conversion and translation, and saves, in a specific memory area, the execution result of the real CPU as the computation result of the encryption computation program running in the virtual operating system 220.

The virtual system driver module 211 prepares context of a processor and a memory page table for the micro-kernel 221, and maps, in the memory page table, original data and a physical address of a buffer area that receives data after encryption computation is completed.

For a CPU, no matter being a real CPU or a virtual CPU, to enable the CPU to perform computation, context of the CPU (values of a register in the CPU) needs to be prepared for the CPU, and codes (instruction sequences) and data (operation targets of the instruction sequences) are prepared in the memory. The CPU executes the instruction sequences one by one, and continuously operates the data, so as to complete the data computing process.

As shown in FIG. 2, in the physical memory space, a first area 101 is configured to storing original data requiring for encryption computation; and a second area 102 is a buffer area configured to storing data after the encryption computation is completed. However, the program running in the operating system directly operates data in a virtual memory space, and mapping between the virtual memory space and the physical memory space is implemented through a page table of the operating system.

In view of the above, if data exchange needs to be directly performed between the host operating system 210 and the virtual operating system 220 through a physical memory, mapping toward the same physical memory space is required to be implemented in page tables of the host operating system 210 and the virtual operating system 220 respectively. In this case, data written into the first area 101 becomes a data source of an encryption program in the virtual operating system 220.

After the encryption process proceeds to the virtual operating system 220, the encryption process manager 222 may first terminate interrupt of the virtual operating system, for example, an interrupt flag bit of a flag register is set to 0, to shield the micro-kernel from responding to an external interrupt request.

In the virtual operating system 220, the encryption program may successfully access, through the page table, the original data stored in the first area 101 of the physical memory, and adopt a built-in encryption algorithm to complete the encryption computation. After the computation is completed, the result is saved in the second area 102 of the physical memory. Correspondingly, in the host operating system 210, the data after the encryption computation is completed may be accessed through the page table.

The original data provided by the protected software 212 may be pure data or a combination of codes and data, which is generally configured to decryption.

When the provided original data is pure data, an encryption algorithm is adopted to perform encryption computation.

When the provided original data is a combination of codes and data, the original data needs to be decrypted according to a predetermined algorithm to obtain the real original data, for example, a built-in password of compression software, such as 7z, is adopted for decompression; the codes are extracted from the real original data; and the extracted codes are run to complete the encryption computation.

After the encryption computation is completed, the virtual system driver module 211 may return the data resulted from the encryption computation to the protected software 212.

In the encryption apparatus of this embodiment, the encryption computation is completed in the virtual operating system 220, and since the context of the CPU in the virtual operating system is completely different from that of a real CPU, a conventional hardware tracking and debugging technology, such as a TF in a DR0-DR7 register or a flag register, is completely invalid in the virtual operating system, thereby ensuring that the encryption computation process in the virtual operating system 220 cannot be interrupted, so as to prevent a cracker from cracking an encryption algorithm by using the hardware tracking and debugging technology.

Furthermore, as a brand-new page table is used in the virtual operating system 220, a memory address (logic address) in the host operating system 210 is invalid to the virtual operating system 220, so a CC breakpoint is generally invalid to the virtual operating system 220. It can be understood that, the CC breakpoint refers to, for example, an INT3 instruction, and with a machine code being CC, the CC breakpoint is also called a CC instruction. When a debugged process executes the INT3 instruction to cause an exception, a debugger captures the exception and stops at the breakpoint, to recover the instruction at the breakpoint to the original instruction. Definitely, if the debugger is written by a user, some other instructions may be used to replace the INT3 instruction to trigger an exception.

However, it can be understood that, the cracker is capable of maliciously forging a CC breakpoint, for example, in the foregoing situation that the original data includes codes, a maliciously forged CC breakpoint may exist in the codes. To solve the above problem, the encryption process manager 222 may return to the host operating system when detecting a soft interrupt (the CC breakpoint belongs to the soft interrupt). It can be understood that, although the interrupt is implemented, the encryption computation process is ended without being completed, and in this case, even if data is obtained, the obtained data is invalid intermediate data, and cannot be configured to cracking the encryption algorithm.

In addition, yet another aspect of the present invention provides a computer readable storage medium which stores computer executable instructions. The computer executable instructions enable a computer or a similar computing apparatus to complete various operations in the encryption method. The storage medium includes, but not limited to, a magnetic disk, an optical disk, a read-only memory (ROM), a random access memory (RAM), random memory (RAM), flash dive, or the likes.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for encryption, comprising:
   loading a virtual system driver module in a host operating system and constructing a virtual operating system, wherein the virtual operating system comprises a micro-kernel;
   preparing and providing context of a processor and a memory page table by the virtual system driver for the micro-kernel, and mapping, in the memory page table, original data and a physical address of a buffer area that receives data after encryption computation is completed; and
   completing the encryption computation in the virtual operating system and saving the computation result in the buffer area, wherein the step of completing the encryption computation in the virtual operating system comprises:
   decrypting, according to a predetermined algorithm, the data on which the encryption computation needs to be performed, to obtain the original data;
   extracting codes from the original data; and
   running the extracted codes to complete the encryption computation.

2. The method according to claim 1, wherein the virtual operating system further comprises an encryption process manager, and wherein the method further comprises:
   ending the encryption computation after the encryption process manager detects a soft interrupt signal and returning to the host operating system.

3. The method according to claim 1, further comprising:
   receiving an encryption computation request from protected software before the virtual system driver prepares the memory page table; and
   returning the encryption computation result to the protected software after the encryption computation is completed.

4. The method according to claim 1, further comprising:
   shutting down the response of the micro-kernel to an external interrupt request before the encryption computation is completed in the virtual operating system.

5. An apparatus for encryption, comprising:
a virtual operating system; and
a driver module,
wherein the virtual operating system comprises a micro-kernel, configured to run an assembly instruction sequence;
the driver module is configured to prepare and provide context of a processor and a memory page table for the micro-kernel, and map, in the memory page table, original data and a physical address of a buffer area that receives data after encryption computation is completed; and
the virtual operating system further comprises an encryption process manager, configured to control the micro-kernel to complete the encryption computation according to the original data and saving the encryption computation result in the buffer area, wherein the micro-kernel, when completing the encryption computation in the virtual operating system, is further configured to:
decrypt, according to a predetermined algorithm, the data on which the encryption computation needs to be performed, to obtain the original data;
extract codes from the original data; and
run the extracted codes to complete the encryption computation.

6. The apparatus according to claim 5, wherein the encryption process manager is further configured to end the encryption computation after detecting a soft interrupt signal and return to the host operating system.

7. The apparatus according to claim 5, wherein the driver module is further configured to:
receive an encryption computation request from protected software before preparing the memory page table; and
return the encryption computation result to the protected software after the virtual operating system completes the encryption computation.

8. The apparatus according to claim 5, wherein the encryption process manager is further configured to shut down the response of the micro-kernel to an external interrupt request before the encryption computation is completed in the virtual operating system.

9. A non-transitory computer-readable medium storing instructions which, when executed by one or more processors, cause an apparatus to perform a method for performing encryption, the method comprising:
loading a virtual system driver module in a host operating system and constructing a virtual operating system, wherein the virtual operating system comprises a micro-kernel;
preparing and providing context of a processor and a memory page table by the virtual system driver for the micro-kernel, and mapping, in the memory page table, original data and a physical address of a buffer area that receives data after encryption computation is completed; and
completing the encryption computation in the virtual operating system and saving the computation result in the buffer area, wherein the step of completing the encryption computation in the virtual operating system comprises:
decrypting, according to a predetermined algorithm, the data on which the encryption computation needs to be performed, to obtain the original data;
extracting codes from the original data; and
running the extracted codes to complete the encryption computation.

10. The non-transitory computer-readable medium according to claim 9, wherein the virtual operating system further comprises an encryption process manager, and wherein the method further comprises:
ending the encryption computation after the encryption process manager detects a soft interrupt signal and returning to the host operating system.

11. The non-transitory computer-readable medium according to claim 9, wherein the method further comprises:
receiving an encryption computation request from protected software before the virtual system driver prepares the memory page table; and
returning the encryption computation result to the protected software after the encryption computation is completed.

12. The non-transitory computer-readable medium according to claim 9, wherein the method further comprises:
shutting down the response of the micro-kernel to an external interrupt request before the encryption computation is completed in the virtual operating system.

* * * * *